United States Patent Office 3,003,813
Patented Oct. 10, 1961

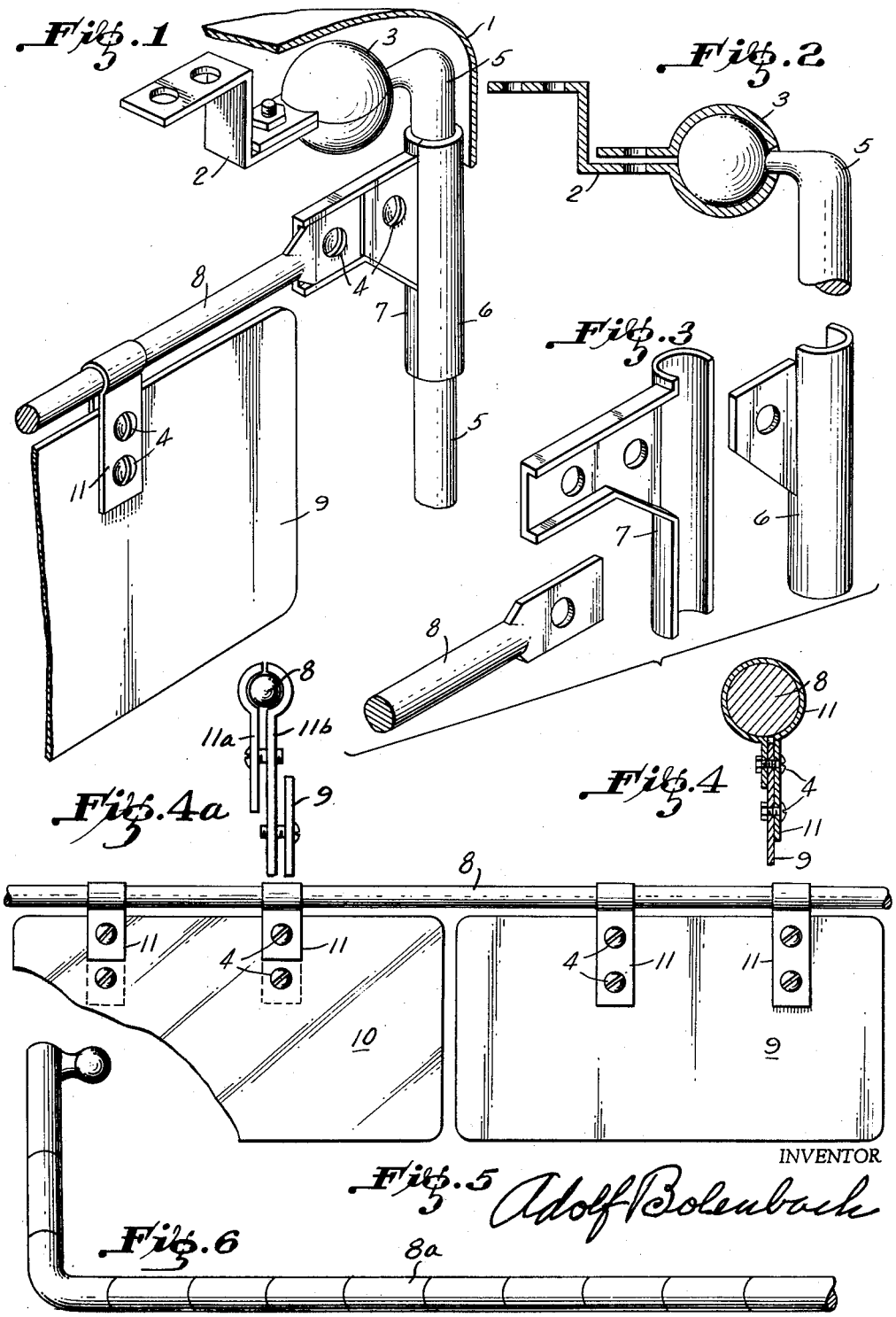

3,003,813
SUN VISOR
Adolf Bolenbach, 12630 Gail Ave., Sunnyvale, Calif.
Filed Mar. 2, 1959, Ser. No. 798,314
3 Claims. (Cl. 296—97)

This invention relates to improved visor panel arrangements and supporting structures for use in motor vehicles and the like.

Objects of the improvements in this visor assembly are to clear the windshield from much unnecessary harmful coverage and to provide more complete protection for the eyes and face of the driver and front seat passengers from direct glare of the sun.

While the present visor panels are large they are not long enough to protect a center seat passenger, or to shut out the direct or angling sun coming through the unprotected middle of the windshield or from behind the mirror, or to shut out the hot sun coming through the back part of the windows. Neither are they wide enough to shut out the low sun glare from the hood, the always low headlight glare or the low sun coming through the window or windshield.

A much smaller visor panel will shut out the body of the sun from one's eyes all day if it is movable up and down and sideways to the right position on the windshield or window. One could then see every thing except the sun, seeing above, below and to the sides of the small panel.

The low sun when rising and setting is the most dangerous, and the present big panels are barely wide enough to shut out the low sun from the eyes of persons with an average eyelevel height. If the driver or passenger is tall, with an high eyelevel, the panel is too low for him and he can only see the road a block or two ahead. If the driver is short with a low eyelevel the sun blinds him and he cannot pull his big panel down any lower. A dangerous situation exists under such conditions. But the small movable panel is easily moved up or down or sideways to protect the eyes of the short, medium or tall driver or passenger so he can see everything except the sun.

In addition to the great advantages stated, my small panel can also be moved to shut out the deadly sun angling in from behind the mirror, also to stop the blinding glare from the hood, to shut out the head light glare and to completely stop the hot sun from coming through the back and low part of the window, for all of which the big, bulky panel is entirely inadequate.

But a single visor panel, even though movable can not take care of a midseat passenger, can not shut out the body of the sun and the glare from the hood occuring at the same time and can not please persons preferring semi-transparent panels, especially to soften headlight glare all night if the panel is left in best position, the driver seeing through and above the panel. Hence I use an opaque and a translucent panel.

My two panel sun visor is simple in construction and provides all the badly needed and desirable advantages mentioned.

Objects and advantages will more clearly appear in the claims and in the description of the drawings wherein;

FIGURE 1 is a perspective view of all structural parts assembled including parts of one of the visor panels.

FIG. 2 is a vertical cross cut of the split horizontal ball socket.

FIG. 3 shows the parts and shanks of the split tubular bracket.

FIG. 4 shows the long rod, a vertical cross cut of the offset tubular clamp, parts and shanks, a part of the opaque panel and how the panel is attached to the clamp.

FIG. 4a is a view similar to FIG. 4 and shows a split offset tubular clamp for securing the panel to the long rod.

FIG. 5 shows the positions of offset clamps on the opaque panel and the translucent panel with the long shank showing on the opaque panel and the short shank showing on the translucent panel.

FIG. 6 shows a combination rod.

The horizontal split ball socket mounting, FIGURES 1 and 2, consists of two parts. The lower part 2 has an upwardly facing hemi-spherical ball receiving socket and a short flat shank extending radially of the socket at one edge thereof. The shank has an upwardly directed extension adapted to be firmly but removeably attached to a slanting ceiling by means of screws extending through apertures in a flange formed on said extension, said flange being bendable to be fitted easily to various ceiling slants while retaining the socket in horizontal position. The upper part 3 has a downwardly facing hemispherical ball receiving socket and a short shank extending radially from one edge of said socket and in juxtaposition with the shank of the lower part. The ball end and small neck of an L-shaped short rod 5 is placed into the cup of part 2, and part 3 with its short flat shank is placed on top thereof and the parts are held together with a screwhead bolt and nut easily accessible for adjustment of needed tension on the ball end of rod 5 suspended vertically from the mounting.

A split tubular bracket consisting of two parts 6 and 7, FIG. 3, is slidably and rotatably mounted on the rod 5 with each part engaging less than one half of the circumference of the rod. The two parts of the bracket are held together by a screw head bolt and nut means 4 which is adjustable to vary to amount of frictional engagement of the bracket 6, 7 with the rod 5. Part 6 has a short shank and part 7 has a long shank to which a long rod 8 is firmly but removably attached at a right angle to rod 5, whereby the rod 8 is thus firmly slidable and rotatable on rod 5.

The long round rod 8, supporting visor panels, differs mainly from the usual visor panel rod because of being movable up and down on windshield or window by means of the split, tubular bracket on the L-shaped short rod 5 instead of being attached to a ceiling bracket.

A small opaque visor panel 9 and a small translucent visor panel 10 are each rotatably and slidably mounted on the long rod 8 by means of a tubular clamp 11 having a tubular portion embracing the rod 8 and spaced radially extending shanks embracing the upper longitudinal edges of the panels 9, 10. Each clamp has a short shank and a long shank and the shanks are secured to the panels 9, 10 by bolt and nut means 4 extending through the shanks and through the panels. The shanks of the clamps 11 do not extend exactly radially of the tubular portions of the clamps but instead are offset to one side of the longitudinal center line of the long rod 8. The clamps 11 secured to the translucent panel 10 are reversely mounted on the rod 8 with respect to the clamps 11 for the panel 9 so that the panels 9, 10 can be slid along the rod into overlapping position. The clamps 11 on the opaque panel 9 are placed on the half of said panel nearest the short L-shaped rod 5 while the clamps on the translucent panel 10 are placed on the half of the panel farthest from said rod 5 in order to permit the panels to be placed in said overlapping position.

Instead of the one piece tubular clamp shown in FIG. 4, the panels may be mounted on the rod 8 by means of a two piece clamp such as is shown in FIGURE 4a. The clamp shown in FIGURE 4a comprises a half tubular portion 11a having a short shank and another half tubular portion 11b having a long shank. The upper longitudinal edge of each panel is secured between the shanks by screw means and the short shank is secured to the long shank by similar screw means which is adjustable to vary the degree of frictional engagement of the clamp with the rod 8.

The rod 8 extends to the center of the windshield and either or both of the small panels may be slid together or one above the other to the center of the windshield or to any other position.

The long rod 8 and the short L-shaped rod 5 may be combined into a unitary rod and FIG. 6 shows such a combination rod 8a. The rod 8a is formed from one long rod bent at right angles near one end to form a short rod portion and a long rod portion, the free end of the short rod portion being bent at right angles to be parallel to and to extend in the same direction as the long rod portion and being formed with a ball end adapted to be received in the ball socket 2, 3.

Other minor variations are possible in this invention, and some have been mentioned but I wish to reserve any rights I may have.

Adjustments are easy. When any movable part gets too loose or tight because of wear, heat or cold as often happens, a dime will quickly adjust the screwhead bolts, so easily accessible.

To protect the midseat passenger, either or both panels are slid toward the middle. To shut out the sun angling in from behind the mirror or through the unprotected middle of the windshield one or both of the panels, or one above the other may be used.

To shut the sun out of one's eyes and also the glare from the hood occurring at the same time one panel is turned up on one end of rod 8 and the other panel turned down near the other end. For headlight glare it is best to use the translucent panel at a point where the glare is most annoying as explained before and leave it there all night.

I claim:

1. A sun visor assembly comprising a split horizontal ball socket mounting having two opposed substantially hemispherical ball sockets, each socket having a substantially horizontal flat shank portion extending outwardly therefrom adjacent the open face of the socket, fastening means securing the shank portion of one socket to the shank portion of the other socket, the lower shank portion having an upwardly extending bendable extension adapted to be fastened to the roof of a vehicle adjacent to its windshield; a substantially L-shaped short rod having a short leg and a long leg, the short leg terminating in a ball end, said ball end being received in the ball socket and frictionally retained therein; a split tubular bracket composed of opposed portions partially and frictionally embracing, the long leg of the L-shaped short rod and rotatable and slidable on said rod, fastening means securing the opposed portions of the split tubular bracket together and controlling the degree of frictional engagement of the split tubular bracket with the long leg of the L-shaped rod; a substantially horizontal rod secured at one end to the split tubular bracket; two pairs of tubular clamps rotatable about and slidable along said horizontal rod, said tubular clamps each including a tubular portion partially embracing the long rod and spaced parallel shank portions extending outwardly from said tubular portion; a small rectangular opaque panel secured at one longitudinal edge between the spaced shanks of one pair of said tubular clamps; and a small translucent panel secured at one longitudinal edge between the spaced shanks of the other pair of said clamps, the shanks of said pairs of tubular clamps being offset with respect to the longitudinal center line of the rod with the clamps for one of said panels being mounted reversely with respect to the clamps for the other panel whereby said panels are adapted to be moved into overlapping positions.

2. A sun visor assembly comprising a horizontal split ball socket mounting having two opposed substantially hemispherical ball sockets each having a flat horizontal shank part extending outwardly from and adjacent to the open face of the socket, fastening means to hold the shank parts together and to fasten them to the ceiling of a vehicle; a substantially L-shaped short rod, having a long leg and a short leg ending in a ball slightly larger than the ball socket; a split tubular bracket composed of two equal opposed substantially half tubular parts each closely engaging frictionally slightly less than one half of the circumference of the long leg of the short L-shaped rod and slidable and rotatable thereon, each half tubular part having a short flat shank extending outwardly from one longitudinal edge of said part at a right angle thereto; said shank parts extending in the same direction, a means to hold said shanks together and to control the degree of frictional engagement of the bracket with the L-shaped rod; a horizontal long rod having one end attached to the shanks of the split tubular bracket; two pairs of split tubular clamps each composed of two opposed substantially half tubular parts each having two longitudinal edges and two open ends, a flat long shank extending from one longitudinal edge of one part, a shorter shank extending in like manner from the edge of said other part parallel to the long shank, a small rectangular opaque panel secured at one longitudinal edge between the spaced shanks of one pair of said tubular clamps; and a small translucent panel secured at one longitudinal edge between the spaced shanks of the other pair of said clamps, the shanks of said pairs of tubular clamps being offset with respect to the longitudinal center line of the rod with the clamps for one of said panels being mounted reversely with respect to the clamps for the other panel whereby said panels are adapted to be moved into overlapping positions.

3. A sun visor assembly comprising a split horizontal ball socket mounting having two opposed substantially hemispherical ball sockets each having a substantially horizontal flat shank extending outwardly therefrom adjacent the open face of the socket, fastening means securing the shanks together, one of the shanks having an extension adapted to be fastened in a firm manner to a vehicle ceiling; a combination rod, having a very long horizontal section, a vertical short center section, and a short horizontal section terminating in a ball end slightly larger than the horizontal ball socket of the mounting, said ball being received in said socket mounting and frictionally retained therein two pairs of tubular split clamps each clamp comprising two opposed tubular parts, one part having a long horizontal flat shank extending from one of its longitudinal edges outwardly, the other part having a short shank adjacent said long shank a small rectangular opaque panel secured at one longitudinal edge between the spaced shanks of one pair of said tubular clamps; a small translucent panel secured at one longitudinal edge between the spaced shanks of the other pair of said clamps, the shanks of said pairs of tubular clamps being offset with respect to the longitudinal center line of the rod with the clamps for one of said panels being mounted reversely with respect to the clamps for the other panel whereby said panels are adapted to be moved into overlapping positions.

References Cited in the file of this patent

UNITED STATES PATENTS

| | | |
|---|---|---|
| 1,840,332 | Riches | Jan. 12, 1932 |
| 1,941,032 | Knowles | Dec. 26, 1933 |
| 2,163,495 | Levy | June 20, 1939 |
| 2,204,691 | Olsen | June 18, 1940 |
| 2,454,613 | Peltier et al. | Nov. 23, 1948 |
| 2,634,161 | Beets | Apr. 7, 1953 |
| 2,695,193 | Hamel | Nov. 23, 1954 |